United States Patent
Matsubara et al.

(10) Patent No.: US 6,698,611 B2
(45) Date of Patent: Mar. 2, 2004

(54) TANK CAP

(75) Inventors: Yasunori Matsubara, Wako (JP); Yoshikazu Yamada, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/284,437

(22) Filed: Oct. 31, 2002

(65) Prior Publication Data

US 2003/0094456 A1 May 22, 2003

(30) Foreign Application Priority Data

Nov. 2, 2001 (JP) ..................................... 2001-337535

(51) Int. Cl.[7] .............................................. B65D 51/16
(52) U.S. Cl. ............... 220/374; 220/203.02; 220/367.1; 220/747; 220/DIG. 33; 220/202; 138/89; 138/96 R
(58) Field of Search ................. 220/203.02, 203.03, 220/203.18, 203.19, 203.28, 367.1, 373, 374, 746, 747, 748, DIG. 32, DIG. 33, 303, 304; 138/96 R, 96 T, 89, 89.1; 215/307

(56) References Cited

U.S. PATENT DOCUMENTS 5,152,419 A * 10/1992 Yanagi ........................ 220/374
5,279,439 A * 1/1994 Kasugai et al. .......... 220/203.23
5,558,244 A * 9/1996 Akaike et al. ............... 220/374

FOREIGN PATENT DOCUMENTS

JP          63-007664      1/1988
JP          10297664 A   * 11/1998   ........... B65D/51/16

* cited by examiner

Primary Examiner—Lee Young
Assistant Examiner—James Smalley
(74) Attorney, Agent, or Firm—Westerman, Hattori, Daniels & Adrian, LLP

(57) ABSTRACT

A tank cap having an upper breather chamber, a lower breather chamber and a separator having a communication bore permitting communication between the chambers. An auxiliary separator in the lower breather chamber is connected to the separator and is provided with upper and lower transverse bores extending from an annular chamber section surrounding upper and lower central chamber sections in the lower breather chamber to the upper and lower central chamber sections, respectively. This arrangement provides an effective damping function against liquid entering into the lower breather chamber to inhibit the flowing of the liquid from the lower breather chamber into the upper breather chamber.

4 Claims, 5 Drawing Sheets

TANK CAP

BACKGROUND OF THE INVENTION

1. Field of the Invention

The present invention relates to a tank cap mounted over a liquid supply port in a tank for storage of a liquid such as fuel, and more particularly to an improvement in such a tank cap, comprising an outer cap element, an inner cap element fitted into the outer cap element, and a separator which is interposed between the outer and inner cap elements to divide a space between the outer and inner cap elements into an upper breather chamber communicating with the outside of a tank and a lower breather chamber communicating with the inside of the tank, and which has a communication bore permitting communication between the upper and lower breather chambers, so that the flowing-out of a liquid in the tank to the outside is inhibited, while permitting the breathing of the tank.

2. Description of the Related Art

Such a tank cap is already known, as disclosed, for example, in Japanese Utility Model Application Laid-open No.63-7664.

In a conventional tank cap, a communication bore permitting communication between the upper breather chamber and the lower breather chamber and the inner breather bore opening into the lower breather chamber are merely disposed vertically with the lower breather chamber interposed therebetween. Therefore, when the liquid in the tank rushes through the inner breather bore into the lower breather chamber, the amount of the liquid entering through the communication bore into the upper breather chamber is relatively large, and the damping function of the lower breather chamber for the liquid entering thereinto is not sufficient.

The present invention has been accomplished with such circumstance in view, and it is an object of the present invention to provide a tank cap wherein the damping function of the lower breather chamber against the liquid entering thereinto can be enhanced to effectively inhibit the flowing of the liquid from the lower breather chamber into the upper breather chamber.

To achieve the above object, according to a first aspect of the present invention, there is provided a tank cap comprising an outer cap element, an inner cap element fitted into the outer cap element, and a separator which is interposed between the outer and inner cap elements to divide a space between the outer and inner cap elements into an upper breather chamber communicating with the outside of a tank and a lower breather chamber communicating with the inside of the tank, and which has a communication bore permitting the communication between the upper and lower breather chambers. An auxiliary separator is connected to the separator to divide the lower breather chamber into a lower central chamber section communicating with the inside of the tank, an upper central chamber section which is disposed immediately above the lower central chamber section and into which the communication bore opens, and an annular chamber section surrounding the upper and lower central chamber sections. The auxiliary separator is provided with an upper transverse bore permitting communication between the upper central chamber section and the annular chamber section, and a lower transverse bore permitting communication between the lower central chamber section and the annular chamber section.

With the first aspect, even when a wave of liquid in the tank is formed, and a portion of the liquid rushes into the lower central chamber section in the lower breather chamber, such liquid hits against a ceiling wall of the lower central chamber section with its wave energy damped. In addition, the lower transverse bore and the upper transverse bore are disposed in positions displaced at least vertically from each other, so that the liquid entering from the lower transverse bore into the annular chamber section scarcely reaches the upper transverse bore. Further, the upper transverse bore and the communication bore open into the upper central chamber section from different directions displaced from each other through 90°, so that wave energy of the liquid entering from the upper transverse bore into the upper central chamber section is damped before reaching the communication bore. Thus, the lower breather chamber can exhibit a high damping function to effectively inhibit the movement of the liquid to the upper breather chamber to reliably prevent the flowing-out of the liquid to the outside of the tank cap.

According to a second aspect of the present invention, in addition to the first feature, the upper central chamber section has a bottom surface formed as a conical convex surface declined toward the upper transverse bore.

With the second aspect, the liquid with its wave energy damped in the upper central chamber section can be guided toward the upper transverse bore by the conical convex surface provided on the bottom surface of the upper central chamber section, and passed via the annular chamber section quickly back into the tank.

According to a third aspect of the present invention, in addition to the first or second aspect, each of the separator and the auxiliary separator is made of a synthetic resin; a first annular projection is formed on an outer peripheral surface of the separator to come into close contact with an inner peripheral surface of the inner cap element; a second annular projection is formed at an upper end of the separator to come into close contact with a ceiling wall of the outer cap element; and a third annular projection is formed at a lower end of the auxiliary separator to come into close contact with a bottom wall of the inner cap element.

With the third feature, the separator as well as the auxiliary separator and the outer cap element as well as the inner cap element can be sealed from each other without use of exclusive sealing members, leading to the simplification of the arrangement.

BRIEF DESCRIPTION OF THE DRAWINGS

A preferred exemplary embodiment of the present invention will now be described as shown in the accompanying drawings, where.

DETAILED DESCRIPTION OF THE PREFERRED EMBODIMENTS

Figure 1:
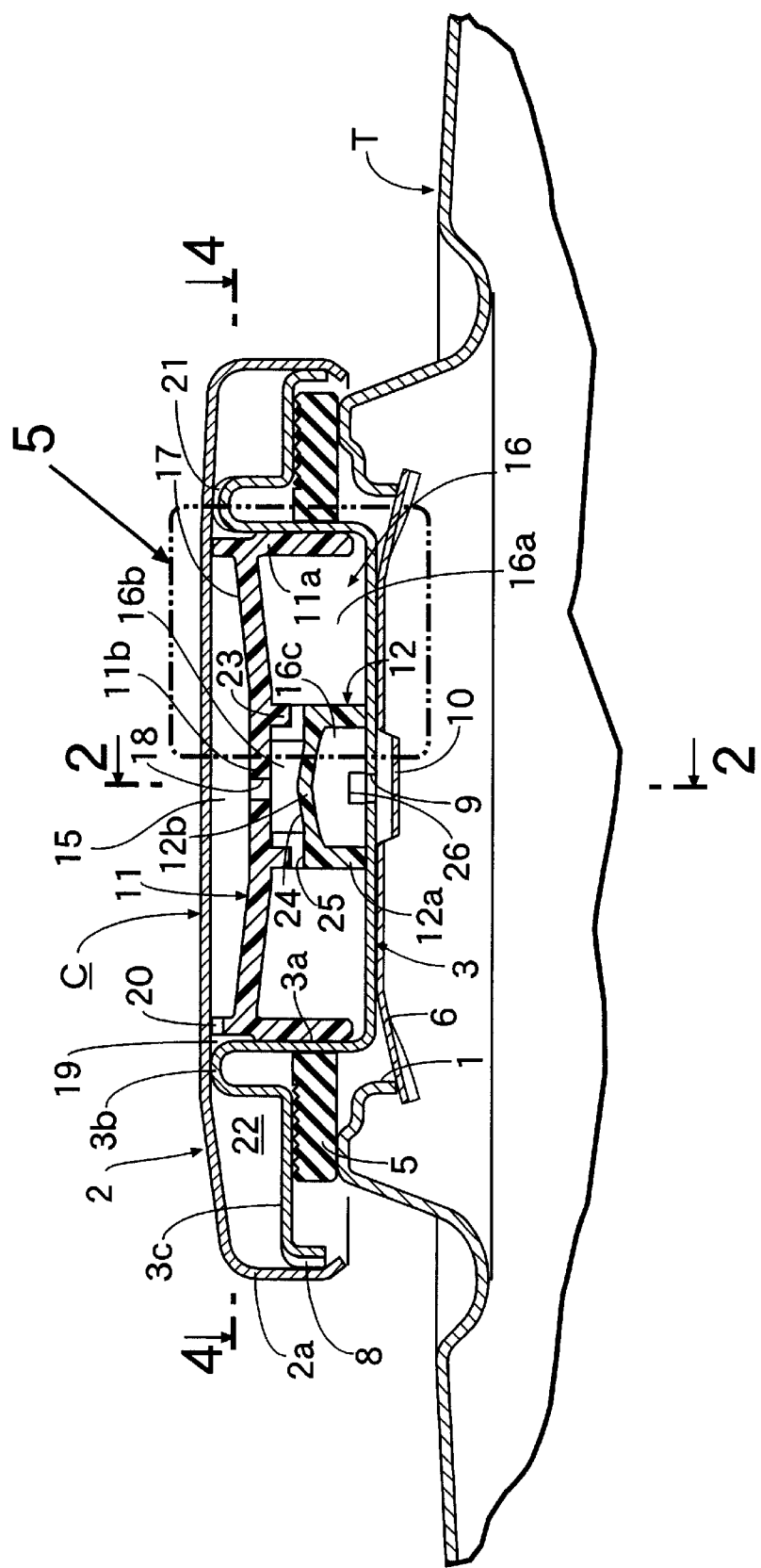
FIG. 1 is a vertical sectional view of a tank cap according to the present invention, shown as being mounted to a fuel tank.
Figure 2:
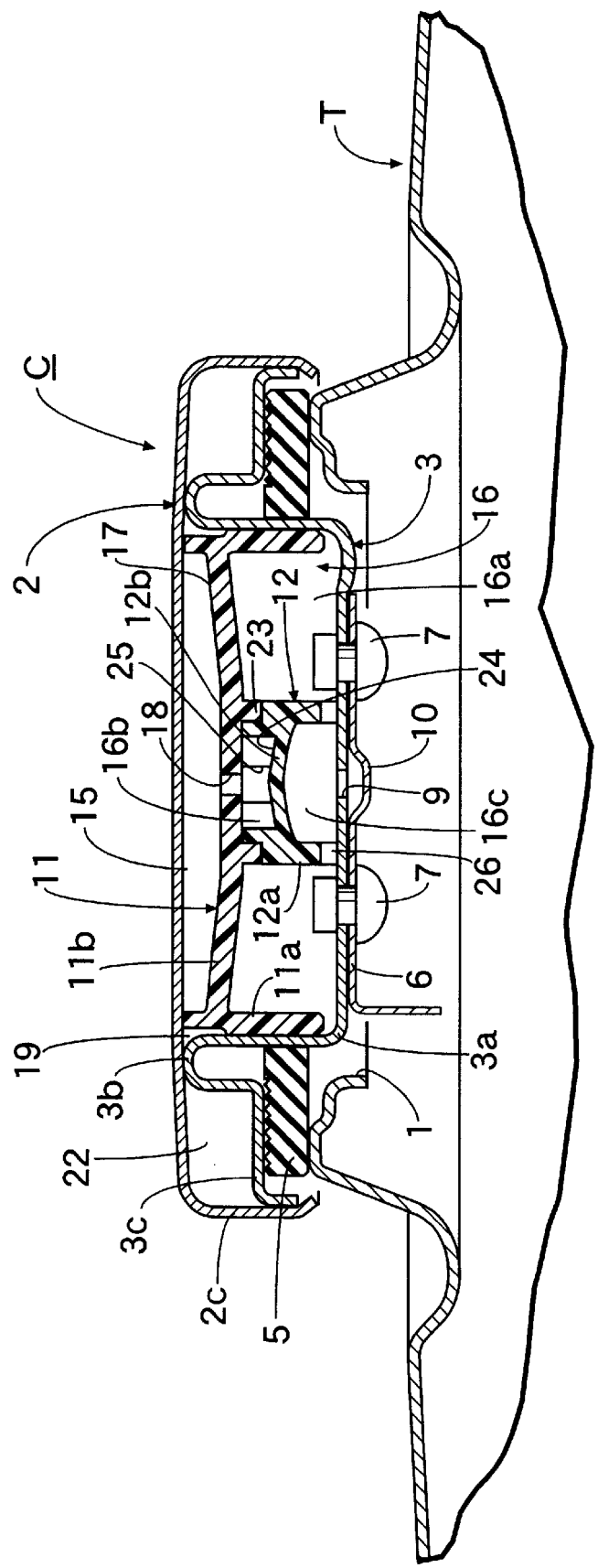
FIG. 2 is a sectional view taken along a line 2—2 in FIG. 1.
Figure 3:
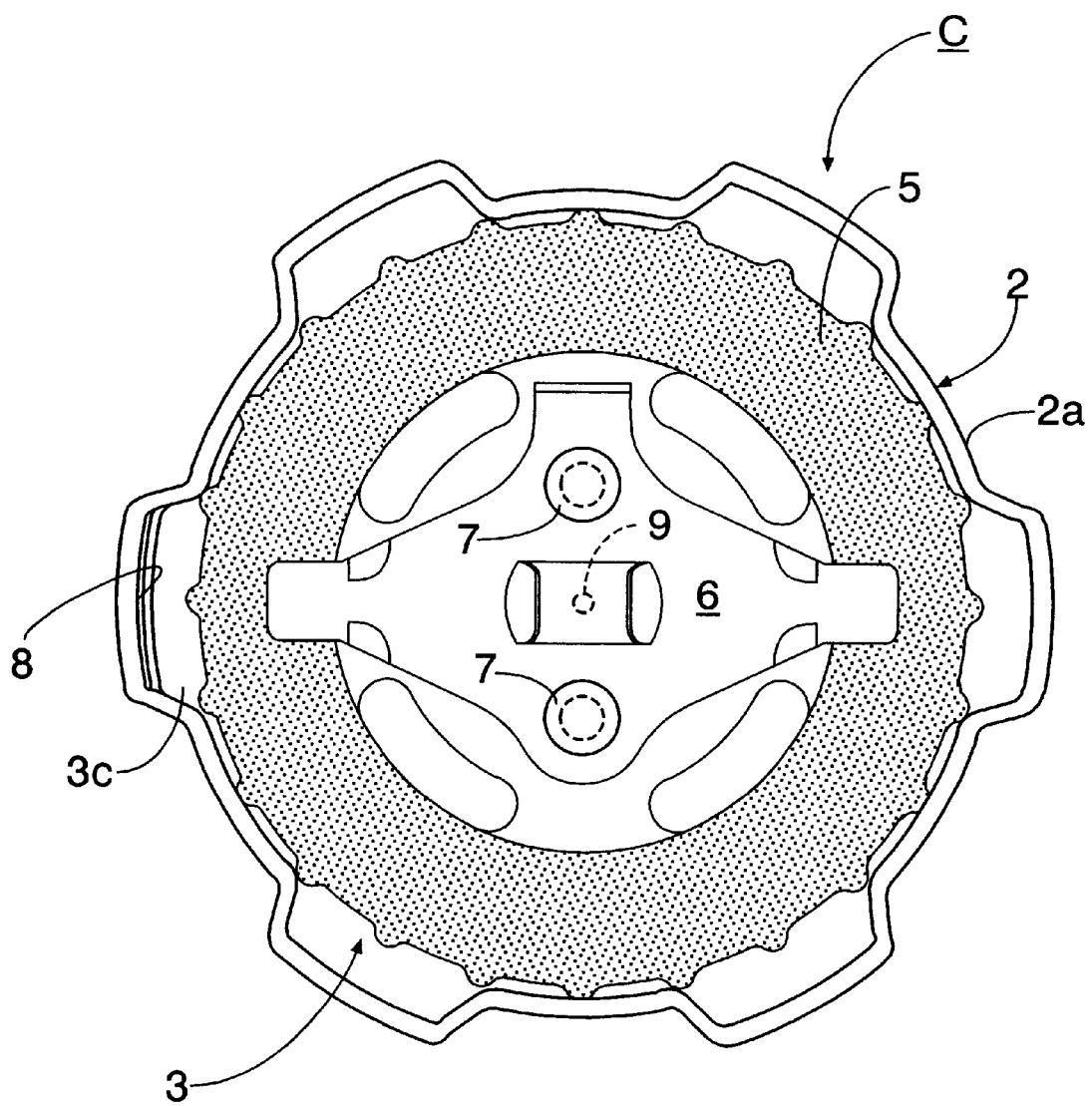
FIG. 3 is a bottom view of the tank cap.
Figure 4:
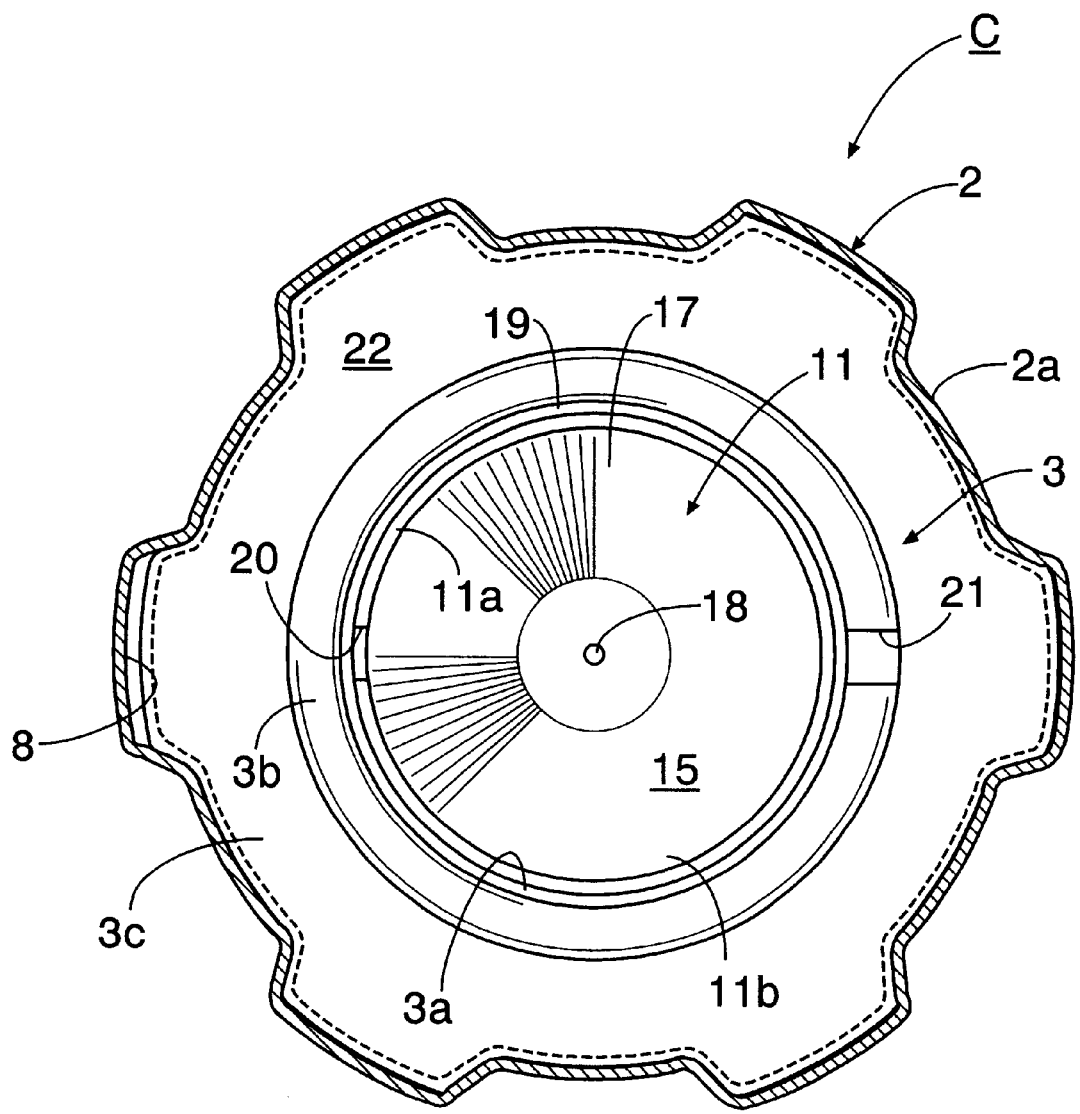
FIG. 4 is a sectional view taken along a line 4—4 in FIG. 1.

First, reference symbol T in FIGS. 1 and 2 denotes a fuel tank for a power working machine or a general-purpose engine. A tank cap C is mounted over an oil supply port 1 in the fuel tank T. The tank cap C includes an outer cap element 2 and an inner cap element 3, each of which are made of a steel plate. The outer cap element 2 has a shallow tubular shroud wall 2a having a lower surface opened. On the other hand, the inner cap element 3 comprises a flat-bottomed cylindrical portion 3a, an annular turn-back portion 3b leading to an upper end of the cylindrical portion 3a, and a flange portion 3c extending radially outwards from an outer side of the turn-back portion 3b. The flange portion 3c is fitted to an inner peripheral surface of the shroud wall 2a of the outer cap element 2, so that an apex of the turn-back portion 3b is in close contact with a ceiling wall of the outer cap element 2. The inner cap element 2 is fixed by caulking a lower end edge of the shroud wall 2a radially inwards.

An annular resilient packing 5 is fitted over an outer periphery of the cylindrical portion 3a of the inner cap element 3. A resilient locking piece 6 made of a steel plate is secured to a bottom wall of the cylindrical portion 3a by a rivet 7, so that the tank cap C is mounted to the fuel tank T by bringing opposite ends of the locking piece 6 into resilient bayonet engagement with an inner end edge of the oil supply port 1. In this case, the packing 5 is clamped between the flange portion 3c of the inner cap element 3 and the fuel tank T to close the oil supply port 1 so that it is liquid-tight.

As shown in FIGS. 1 to 4, an inner breather bore 9 is provided in a central region of the bottom wall of the cylindrical portion 3a of the inner cap element 3, and a baffle portion 10 is formed on the locking piece 6, so that it is opposed to the inner breather bore 9 from below.

A separator 11 and an auxiliary separator 12 are disposed at the cylindrical portion 3a of the inner cap element 3. The separator 11 comprises a cylindrical wall 11a fitted to an inner peripheral surface of the cylindrical portion 3a, and a partition wall 11b integrally coupled to an inner peripheral surface of the cylindrical wall 11a to divide a space defined between the cylindrical portion 3a and the outer cap element 2 into an upper breather chamber 15 and a lower breather chamber 16. An upper surface of the partition wall 11b is formed as a conical concave surface 17 declined toward the center, and a communication bore 18 is provided at a central portion of the partition wall 11b. An annular passage 19 is defined between an upper portion of the cylindrical wall 11a and the turn-back portion 3b of the inner cap element 3, and an inner notch 20 is provided in an upper end of the cylindrical wall 11a to permit the upper breather chamber 15 to communicate with the annular passage 19.

An outer annular chamber 22 is defined between the outer cap element 2 and the inner cap element 3 and disposed between the shroud wall 2a and the turn-back portion 3b, and an outer notch 21 is provided in an upper end of the turn-back portion 3b to permit the outer annular chamber 22 to communicate with the annular passage 19. An outer breather bore 8 is defined between fitted surfaces of the shroud wall 2a of the outer cap element 2 and the flange portion 3c of the inner cap element 3 to release the outer annular chamber 22 to the outside of the tank cap C.

The auxiliary separator 12 comprises a cylindrical wall 12a having a diameter smaller than that of the cylindrical wall 11a of the separator 11, and a partition wall 12b integrally coupled to an inner peripheral surface of the cylindrical wall 12a. The auxiliary separator 12 is disposed, so that a smaller-diameter upper end of the cylindrical wall 12a is fitted in and connected to an annular fitting portion 23 on a lower surface of the partition wall 11b, and a lower end face of the cylindrical wall 12a is in close contact with the bottom surface of the cylindrical portion 3a of the inner cap element 3, and so that the inner breather bore 9 is accommodated in the cylindrical wall 12a. The lower breather chamber 16 is divided into an annular chamber section 16a surrounding the cylindrical wall 12a, an upper central chamber section 16b above the partition wall 12b within the cylindrical wall 12a, and a lower central chamber section 16c below the partition wall 12b within the cylindrical wall 12a. A notch-shaped upper transverse bore 25 is provided in the upper end of the cylindrical wall 12a to provide communication between the annular chamber section 16a and the upper central chamber section 16b, and a notch-shaped lower transverse bore 26 is provided in a lower end of the cylindrical wall 12a to provide communication between the annular chamber section 16a and the lower central chamber section 16c. In this case, both the transverse bores 25 and 26 are disposed with their phases displaced from each other in a circumferential direction of the cylindrical wall 12a. The communication bore 18 and the upper transverse bore 25 open into the upper central chamber section 16b from different directions displaced from each other through 90°.

Figure 5:
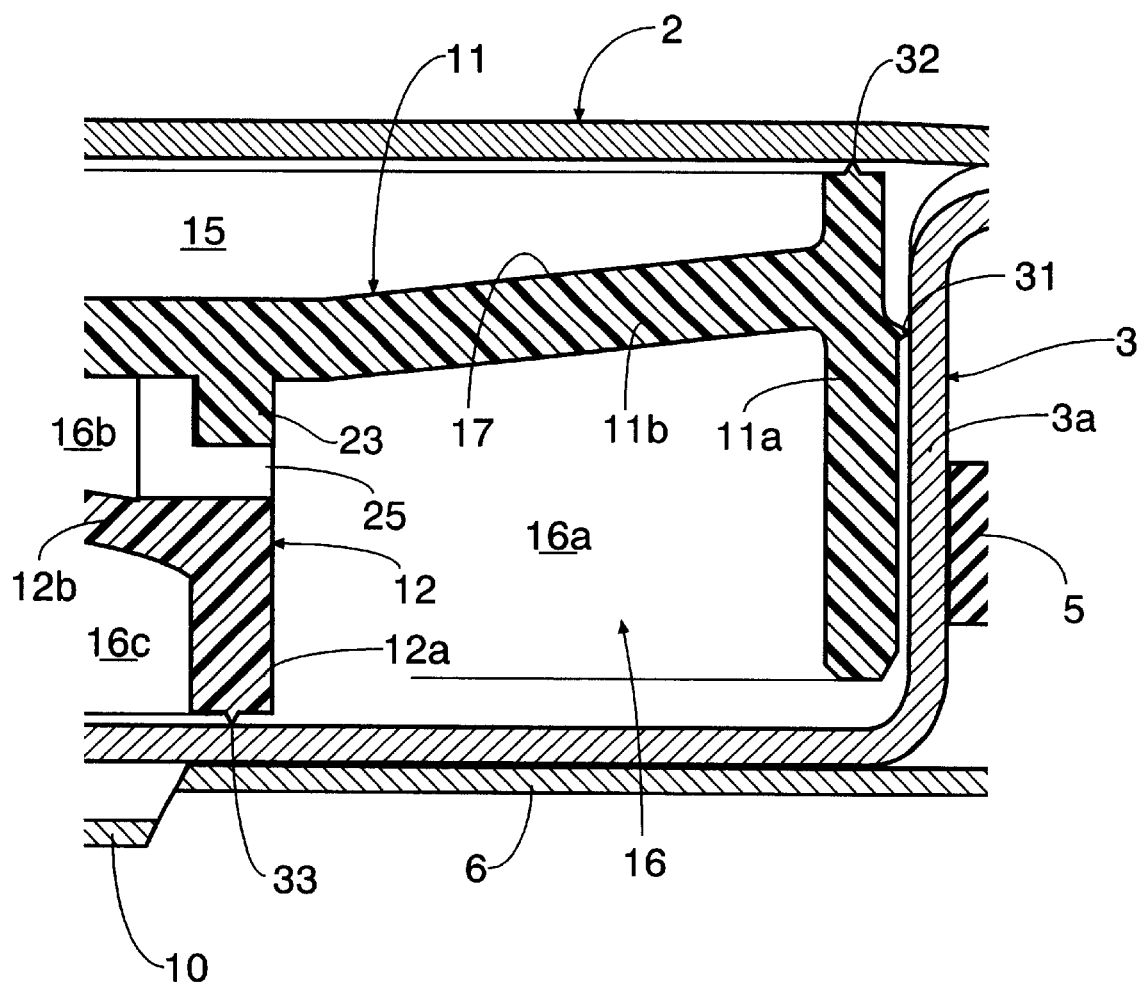
FIG. 5 is an enlarged view of a section indicated by 5 in FIG. 1.

As shown in FIG. 5, a first annular sealing projection 31 is integrally formed on an outer peripheral surface of the cylindrical wall 11a of the separator 11 to come into resilient close contact with the inner peripheral surface of the inner cap element 3, and a second annular sealing projection 32 is integrally formed at the upper end of the cylindrical wall 11a to come into resilient close contact with the ceiling wall of the outer cap element 2. In addition, a third annular sealing projection 33 is integrally formed at the lower end of the auxiliary separator 12 to come into resilient close contact with the bottom surface of the cylindrical portion 3a.

The operation of the preferred embodiment will be described below.

When the internal pressure in the fuel tank T is lowered or raised as a result of the consumption of fuel or a change in temperature, the fuel tank T can breath through a path comprising the outer breather bore 8, the outer annular chamber 22, the outer notch 21, the annular passage 19, the inner notch 20, the upper breather chamber 15, the communication bore 18, the upper central chamber section 16b, the upper transverse bore 25, the annular chamber section 16a, the lower transverse bore 26, the lower central chamber section 16c and the inner breather bore 9.

If external air including foreign matter such as dust or rain water flows through the outer breather bore 8 into the outer annular chamber 22 upon depressurization of the fuel tank T, the foreign matter is dropped with its energy lost by the damping action of the chamber 22 and thus, only the air is drawn via the passage into the fuel tank T. The foreign matter dropped in the outer annular chamber 22 is discharged through the outer breather bore 8 to the outside of the tank cap C upon breathing of the fuel tank T.

When the fuel in the fuel tank T forms a wave which impacts against the lower surface of the tank cap C due to the vibration or tilting of the fuel tank T, the baffle portion 10 first receives the fuel to resist the entrance of the fuel into the inner breather bore 9. However, when a large amount of the fuel impacts against the lower surface of the tank cap C, a portion of the fuel enters into the lower central chamber section 16c from opposite sides of the baffle portion 10 via the inner breather bore 9, but the fuel entering into the lower central chamber section 16c impacts against the ceiling wall of the chamber section 16c, resulting in dampening of its wave energy, and most of such fuel is allowed to flow through the inner breather bore 9 and downwards back into the fuel tank T. If a portion of the fuel is passed from the lower central chamber section 16c through the lower transverse bore 26 into the annular chamber section 16a, it is subjected to the damping action also in the chamber section 16a. Moreover, the fuel entering from the lower transverse bore 26 into the annular chamber section 16a barely reaches the upper transverse bore 25, because the lower transverse bore 26 and the upper transverse bore 25 are disposed in the positions displaced vertically and circumferentially.

Further, even if the fuel enters from the annular chamber section 16a through the upper transverse bore 25 into the upper central chamber section 16b, such fuel has its wave energy damped in the upper central chamber section 16b before reaching the communication bore 18, because the upper transverse bore 25 and the communication bore 18 open into the upper central chamber section 16b from the different directions displaced from each other through 90°. In this manner, the damping function of the lower breather chamber section 16c is enhanced and hence, it is possible to effectively inhibit the fuel passing through the inner breather bore 9 from passing via the communication bore 18 into the upper breather chamber 15 to reliably prevent outflow of the fuel to the outside of the tank cap C.

Because the bottom surface of the upper central chamber section 16b is formed as the conical convex surface 24 declined toward the upper transverse bore 25, when the fuel with its wave energy damped in the upper central chamber section 16b is dropped to the bottom surface of the chamber section 16b, such fuel can flow naturally on the convex surface 24 toward the upper transverse bore 25, and then flow quickly to the annular chamber section 16a and further sequentially via the lower transverse bore 26, the lower central chamber section 16c and the inner breather bore 9 back into the fuel tank T.

If the fuel should flow from the upper central chamber section 16b via the communication bore 18 into the upper breather chamber 15 in response to the breathing of the fuel tank T, such fuel is dropped to the bottom surface of the upper breather chamber 15 with its wave energy dissipated by the damping action of the chamber 15 and thus, only the air is discharged via the above-described path to the outside of the tank cap C.

Because the bottom surface of the upper breather chamber 15 is formed as the conical concave surface 17 declined toward the communication bore 18, when the fuel with damped wave energy in the upper breather chamber 15 is dropped to the bottom surface of the chamber 15, such fuel flows naturally on the concave surface 17 toward the communication bore 18 and then flows downwards quickly to the upper central chamber section 16b.

The fitted regions of the cylindrical portion 3a of the inner cap element 3 and the cylindrical wall 11a of the separator 11 are sealed by bringing the first annular sealing projection 31 integrally formed on the outer periphery of the cylindrical wall 11a into resilient close contact with the inner peripheral surface of the cylindrical portion 3a, and the abutments of the cylindrical wall 11a and the outer cap element 2 are sealed by bringing the second annular sealing projection 32 integrally formed at the upper end of the cylindrical wall 11a into resilient close contact with the ceiling wall of the outer cap element 2. Further, the abutments of the auxiliary separator 12 and the inner cap element 3 are sealed by bringing the third annular sealing projection 33 integrally formed at the lower end of the cylindrical portion 12a of the auxiliary separator 12 into resilient close contact with the bottom wall of the cylindrical portion 3a of the inner cap element 3. Therefore, the separator 11 as well as the auxiliary separator 12 and the outer cap element 2 as well as the inner cap element 3 can be sealed from each other without use of exclusive sealing members, leading to a reduction in number of parts and the simplification of the arrangement.

The present invention is not limited to the above-described embodiment, and various modifications in design may be made without departing from the subject matter of the present invention. For example, the tank cap C is not limited to the use for the fuel tank T, and may be used for an oil tank or any other tank.

What is claimed is:

1. A tank cap comprising:

an outer cap element;

an inner cap element fitted into said outer cap element; and a separator which is interposed between said outer and inner cap elements to divide a space between said outer and inner cap elements into an upper breather chamber communicating with the outside of a tank and a lower breather chamber communicating with the inside of the tank, said separator having a communication bore permitting the communication between said upper and lower breather chambers, wherein an auxiliary separator is connected to said separator to divide said lower breather chamber into a lower central chamber section communicating with the inside of the tank, an upper central chamber section which is disposed immediately above said lower central chamber section and into which said communication bore opens, and an annular chamber section surrounding said upper and lower central chamber sections, said auxiliary separator being provided with an upper transverse bore permitting communication between said upper central chamber section and said annular chamber section, and a lower transverse bore permitting communication between said lower central chamber section and said annular chamber section.

2. A tank cap according to claim 1, wherein said upper central chamber section has a bottom surface formed as a conical convex surface declined toward said upper transverse bore.

3. A tank cap according to claim 1, wherein each of said separator and said auxiliary separator is made of a synthetic resin; a first annular projection is formed on an outer peripheral surface of said separator to come into close contact with an inner peripheral surface of said inner cap element; a second annular projection is formed at an upper end of said separator to come into close contact with a ceiling wall of said outer cap element; and a third annular projection is formed at a lower end of said auxiliary separator to come into close contact with a bottom wall of said inner cap element.

4. A tank cap according to claim 2, wherein each of said separator and said auxiliary separator is made of a synthetic resin; a first annular projection is formed on an outer peripheral surface of said separator to come into close contact with an inner peripheral surface of said inner cap element; a second annular projection is formed at an upper end of said separator to come into close contact with a ceiling wall of said outer cap element; and a third annular projection is formed at a lower end of said auxiliary separator to come into close contact with a bottom wall of said inner cap element.

* * * * *